United States Patent [19]

Buss

[11] 3,981,273
[45] Sept. 21, 1976

[54] FISH HUSBANDRY SYSTEM
[76] Inventor: Keen W. Buss, 967 Wall Station, Boalsburg, Pa. 10005
[22] Filed: Dec. 20, 1974
[21] Appl. No.: 534,923

Related U.S. Application Data

[60] Division of Ser. No. 405,633, Oct. 11, 1973, abandoned, which is a division of Ser. No. 162,910, July 15, 1971, abandoned, which is a continuation-in-part of Ser. No. 16,830, March 5, 1970, abandoned.

[52] U.S. Cl. ................................................. 119/3
[51] Int. Cl.² ......................................... A01K 63/00
[58] Field of Search ................................... 119/3, 5

[56] References Cited
UNITED STATES PATENTS
2,944,513   7/1960   Keely ............................... 119/3

OTHER PUBLICATIONS
Innovations for Fish Culturists No. 1 1968 Keen Buss et al., pp. 1–6.

Primary Examiner—Hugh R. Chamblee

[57] ABSTRACT

A fish husbandry system which provides for high density raising of fish under controlled conditions. The fish are confined in a plurality of upright, water-filled tanks through which water is conducted in serial flow by conduits. Air or oxygen is introduced into the water in the bottom region of each tank. The flow of water within each tank is from the bottom to the top so that fish waste products are carried upwardly out of the tank and also so that the head of water within the tank assists solution of the oxygen in the water. Waste products, solid and dissolved, are removed from the water as it passes from one tank to the next.

2 Claims, 4 Drawing Figures

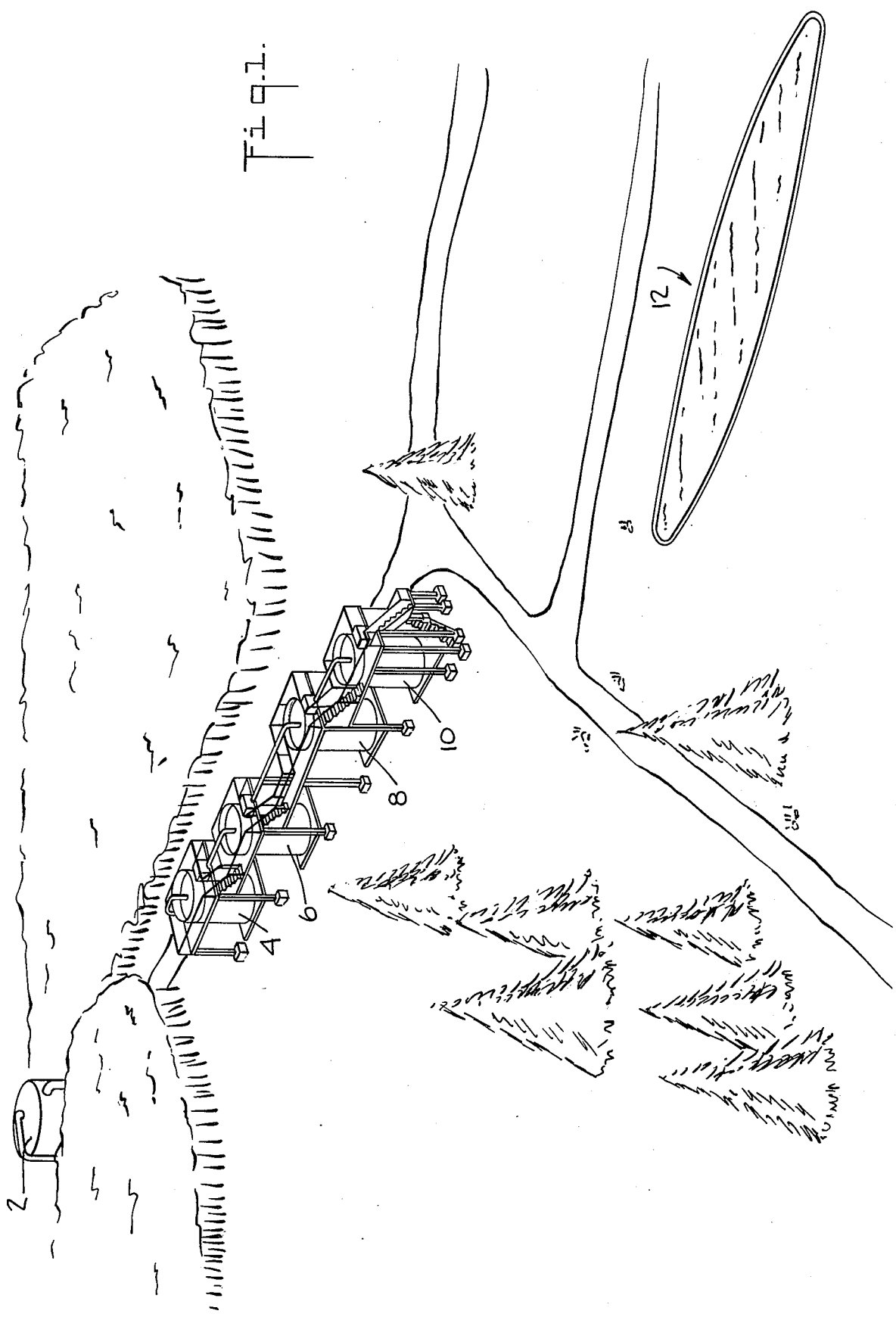

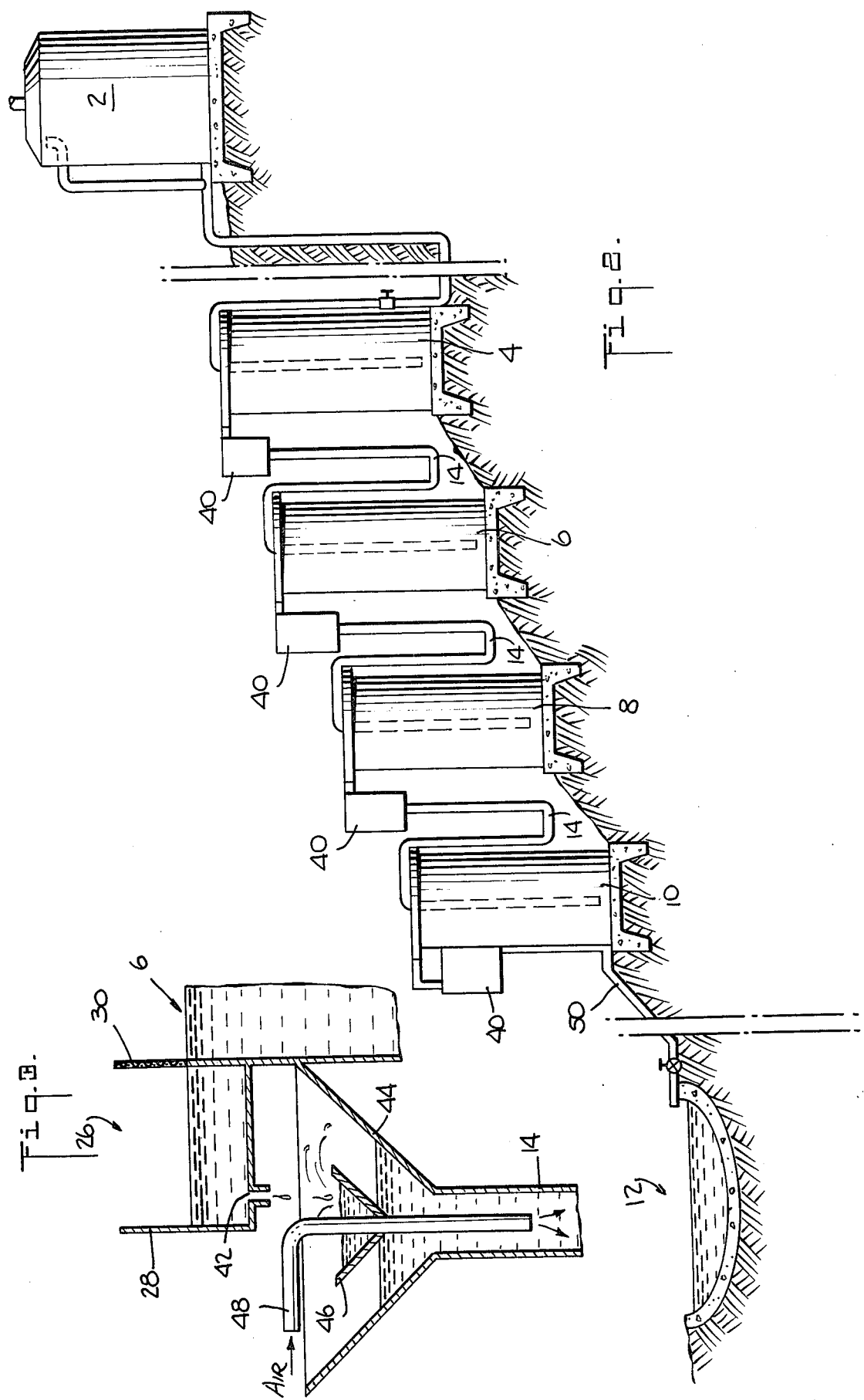

FISH HUSBANDRY SYSTEM

RELATED APPLICATIONS

This application is a division of application Ser. No. 405,633, filed Oct. 11, 1973, now abandoned, which is a division of application Ser. No. 162,910, filed July 15, 1971, now abandoned and which is a continuation-in-part of application Ser. No. 16,830, filed Mar. 5, 1970, now abandoned.

BACKGROUND OF THE INVENTION

This invention relates to a system for raising fish under a controlled environment, and more specifically for fish farming for commercial purposes at high density.

Fish husbandry under a controlled environment, sometimes referred to as fish farming, offers numerous advantages which are by now well known. Some of these advantages are the ability to provide large quantities of good quality high protein food at a relatively low cost, the opportunity to regularize the supply of gourmet fish subject in nature to seasonal fluctuations and the ability to conduct operations at inland locations thereby increasing the availability of fish to residents located far from the coastline.

Such commercial potential has stimulated interest in fish husbandry and it has been discovered experimentally that confined fish can be grown in much higher concentrations of fish per cubic foot of water than was formerly believed possible. For example under suitable conditions fish can be raised at concentrations in excess of 6 pounds of fish per cubic foot of water. To grow fish at this density commercially would be very advantageous as it would offer the opportunity to obtain a maximized yield of fish within the limitations of space available, and oxygen and water supply.

Currently known fish farming methods, however, would not generally be adaptable to fish farming at such high concentrations by reason of limitations inherent in their design which render it impossible to achieve the unusually high through-put of oxygen, food and water necessary to sustain fish life at such concentrations. For example one prior system utilizes a plurality of tanks arranged in a cascade with walls dividing each tank internally into a fish room and a filter room. Water passes through a filter in the bottom of the fish room, into the filter room from which the filter water overflows and falls into the open top of the fish room of the next succeeding downstream tank. Aeration of the water is through exposure of the surface of the water in the fish room to the atmosphere. Although satisfactory for its intended purpose, such a prior structure, relying solely on exposure of the water surface to the atmosphere, would not provide sufficient oxygen necessary to sustain the life of fish contained at extremely high concentration within the tank. This is because fish, at a high concentration, require very large amounts of oxygen to be supplied to the water (a) because of the aggregate breathing demands of the very large number of fish present, and (b) to oxidize and thus offset the toxic effects of the considerable output of waste products which the numerous fish produce in the body of water within which they are confined.

Additionally the prior structure described relying on a flow of water downwardly within each fish room does not provide any hydrostatic head of water assisting the oxygen into solution at the point at which it is introduced, namely the surface of the water in the fish room. Even if additional air were bubbled into the bottom of the water in the filter room so that the water was oxygenated prior to entering the next fish room downstream, the water would still enter at the water surface in the next fish room and much of the oxygen would pass out of solution there and be lost.

Another problem with the prior structure, if it were to be used for high concentration fish farming, would arise in connection with the high output of solid, fish waste products from the large number of fish involved, which would be carried downwardly by the flow of water in the fish room and accumulate on the bottom. To avoid a buildup of toxic products to a dangerous level and to prevent clogging of the water flow, it would frequently be necessary to drain the tanks for cleaning presenting a major problem in the fish raising operation.

SUMMARY OF THE INVENTION

The present invention provides a system of fish husbandry which permits the raising of fish in extremely high concentrations within a given volume of water while providing all the conditions necessary for sustaining life and growth in terms of supply of water, oxygen and food and removal of waste products. For example the concentrations which this invention makes possible are of the order of 6 pounds of fish per cubic foot of water, or even higher.

More specifically, a fish husbandry system according to the present invention, includes a plurality of generally vertical, water-filled tanks each adapted to contain fish. Air is introduced into the water in the bottom region of each tank to oxygenate the water. Conduits connecting the tanks conduct water successively through the tanks in a serial flow path in which the water enters each tank in its bottom region and flows upwardly to exit from the upper region of the tank. By this arrangement in each tank the flow of water carries the fish waste products upwardly out of the tank and also the head of water within the tank assists solution of the oxygen in the water thereby minimizing oxygen loss. Flow of water from one tank to the next is by gravity, with the tanks being so arranged that the water level in each is spaced above the water level in the next downstream tank.

To remove the fish waste products from the water as it passes from one tank to the next, filters are provided for removing the solid waste products from the water. In addition, as the water passes through the conduits it is subjected to turbulence in a region in communication with the atmosphere so that dissolved gaseous waste products in the water come out of solution and vent to atmosphere.

Aeration of the water is effected by providing a region of each conduit in communication with the atmosphere, in which the rapid flow of water through the conduit sucks in air from the atmosphere to oxygenate the water. Additional oxygenation is provided by an injector at the lower end of each tank which injects a stream of finely dispersed oxygen-containing bubbles into the water in the bottom region of the tank. Because the water in the bottom region of the tank, which contains oxygen either from the injector or from the air drawn in the preceding conduit, is under a substantial head of water the oxygen is under sufficient pressure to cause a major portion of it to go in solution. As the water passes upwardly through the tank much of the oxygen is used by fish for breathing while a remaining part of the oxygen is used to oxidize certain of the dissolved fish waste products in the water thus reducing their harmful effect. A residuum of the dissolved oxygen passes out of the tank still in solution in the water. It will be appreciated that by introducing the oxygen at the bottom of the tank in this manner and having an upward flow of water within the tank, a very much improved and highly efficient use of the oxygen is obtained. This is particularly important in view of the very large oxygen requirements imposed by the high concentration of fish within the water.

BRIEF DESCRIPTION OF THE DRAWINGS

A system for fish husbandry, constructed in accordance with one preferred embodiment of the invention, is illustrated in the accompanying drawings in which:

FIG. 1 is a perspective schematic view of a system of fish husbandry constructed in accordance with the preferred embodiment of this invention, showing four water-filled fish tanks and a raceway;

FIG. 2 is a side view of the fish tanks and the raceway shown in FIG. 1;

FIG. 3 is a cross-sectional side view of a water creating device forming a part of the system shown in FIG. 1.

DETAILED DESCRIPTION

Figure 4:
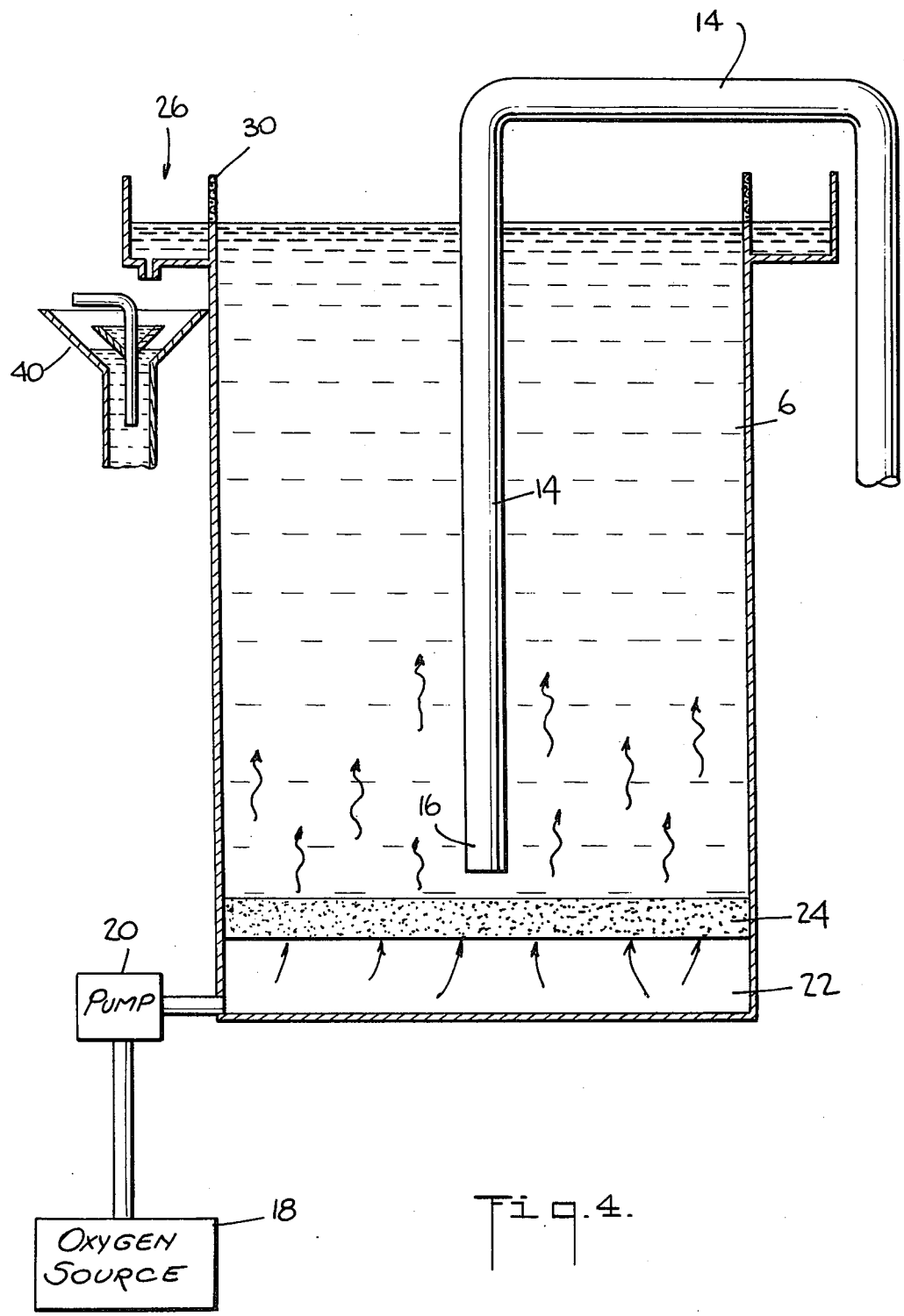
FIG. 4 is a cross-sectional side view of one of the tanks shown in FIG. 1 showing additional structure for injecting oxygen into the water.

Referring to FIG. 1 of the drawings, a system of fish husbandry constructed in accordance with one preferred embodiment of the invention, is there shown.

The system includes a water storage tank 2, four upright, water-filled fish tanks 4, 6, 8 and 10, and a raceway 12. The storage tank and fish tanks are mounted on concrete footings 14 (FIG. 2) on the side of a hill with the water levels in each of the tanks being vertically spaced in descending downstream relation, from the storage tank 18 to the last of the fish tanks 10. The tanks are connected by intervening conduits (described in detail hereinafter) so that water can flow from the storage tank 2 in cascade relation through the fish tanks 4–10 to the raceway 12. Water is supplied to the storage tank 2 continuously from a suitable source (not shown) to provide a continuous uniform flow of water through the system when the system is operating.

The fish tanks 4, 6, 8 and 10 are all of similar construction and the following description of the second tank 6 (FIG. 4) applies to the other fish tanks 4, 8 and 10. The tank 6 is a massive cylindrical drum open at its upper end and, in the preferred embodiment, has a water capacity of approximately 5,500 gallons. The tank is a deep tank to provide an adequate head of water in the tank with a ratio of depth in the water-filled region to largest cross-sectional dimension, i.e. diameter, is about 3 to 1.

Fish, usually fingerlings from a suitable source, are introduced into the tank 6 through its open upper end and remain in the tank for as many months as is necessary to complete their growth to the desired size and age at which time the grown fish are removed through the open top of the tank using suitable conventional fish handling tools such as nets, scoops and the like. Within any particular one of the fish tanks, the fish will usually all be at the same stage of growth to avoid the following problems that would otherwise arise e.g. the possibility of smothering of the smaller fish by the larger fish, the problem of sorting fishes of different size upon removal from the tank, the problem of adjusting the food requirements so that some fish don't starve while others are overfed, problems of cannibalism of the smaller fish and other such problems. However, as between different fish tanks it may be desirable to have fish at one stage of growth in one tank and at a different stage of growth in another tank in order to operate the system most efficiently.

Water is introduced into the tank 6 by a vertical conduit 14 extending centrally down into the tank and connected therewith by suitable conventional supporting structure (not shown). The open lower end 16 of the conduit 14, constituting the inlet to the tank 6, is positioned in a bottom region of the tank spaced above the closed lower end thereof. The upper end of the conduit 14 communicates with the outlet of the preceding upstream tank 4 and receives water therefrom. Air is introduced into the water passing along the conduit 14 (as will be described hereinafter) so that the water introduced into the bottom region of the tank 6 through the inlet 16 contains substantial quantities of oxygen both as dissolved oxygen and as bubbles of air. It will be understood that, in view of the massive nature of the tank 6, pressure in the bottom region exerted by the hydrostatic head of water in the tank is considerable (for example using a 17 foot tank the pressure in the bottom region would be close to 1.5 atmospheres) tending to assist the oxygen in the bubbles into solution and maintaining the oxygen already in solution in that condition. Such an arrangement offers marked advantages over any system whereby oxygenated water is introduced at the top of a fish tank. The water then flows upwardly within the tank carrying the oxygen to the fish and providing the necessary oxygen to oxidize many of the harmful fish wastes thrown off by the fish. These fish wastes include solid excreta, and various soluble metabolites including ammonium salts and carbon dioxide.

The water in the bottom region of the tank is additionally oxygenated by a supply of oxygen from a suitable source 18, which may be a liquid oxygen bottle, connected by a pressure pump 20 to an oxygen chamber 22 at the lower end of the tank. The oxygen chamber 22 extends between the bottom of the tank and a porous plate 24 extending completely across the lower end of the drum in sealing contact with the walls thereof, spaced closely below the entry end 16 of the pipe 14. The plate 24 is a fine pore porous floor through which oxygen is injected into the tank in a bubble size preferably somewhere between 0.1 and 0.5 millimeters in diameter. The diameter of these bubbles will decrease as the oxygen bubbles move up through the tank and are dissolved in the water. Alternatively the plate 24 can be composed of a Carborundum stone or any other diffuser or the plate can be criss-crossed with fine mesh nylon tubes into which oxygen is pumped. It will be understood that the pressure at which the oxygen is introduced has to be sufficiently high to overcome the water pressure on the upper side of the plate. In the same way as previously described the fact that the oxygen is introduced at the bottom of the tank enables the hydrostatic head of the water in the tank to be used to advantage in assisting the oxygen into solution, thereby contributing to the most efficient use of the oxygen supplied. The water in the bottom region should be as near saturated as possible with oxygen. Excess bubbles of oxygen rising in the tank pass into solution as the oxygen already in solution is used by the fish and is used to oxidize waste products. For example at a water temperature of 50°F, a close to saturation dissolved oxygen level may be between 9.5 and 10.0 milligram per liter of water.

The plate 24 performs a valuable function in insuring that the bubbles are introduced into the tank evenly over its entire width so that oxygen is carried throughout substantially all of the tank.

Furthermore by placing the plate 24 adjacent the lower end 16 of the pipe 14, the incoming water is forced to spread out across the bottom of the tank to the walls thereof, so that the air in the incoming water from the conduit is also distributed equally over the entire cross-sectional area thereof. The water flow distribution thus effected causes the water in the tank to move upwardly as a generally uniform, non-turbulent body extending substantially across the entire width of the tank, so that the up-flow of water carries the oxygen to all the fishes whether they are at the center or the periphery of the tank and at the same time carries upwardly substantially all the waste products they produce.

It will be understood that an important feature of the invention thus far described is the provision of an upward flow of oxygenated water from the bottom of the tank to the top. Significant advantages arising from the use of the upward flow are the use of the hydrostatic head of the water within the tank to maintain the oxygen in the water in solution, and the movement of substantially all the waste products to the top of the tank where they pass out of the tank thus minimizing the need for draining of the tank to remove built up wastes. Also the upward flow of liquid, as opposed to a downward flow, enables the weaker fish to maintain their position within the tank without being driven to the bottom of it.

Another factor that has been found to be of great importance is the rate and type of upward flow of the water in the tank. If the rate of flow is too slow, fish wastes will fall to the bottom of the tank and a dangerously high toxic level may build up. If the rate is too high the fish may tend to be carried to the top of the tank and subjected to over pressure, in addition the water may become turbulent which can disturb the fish and adversely affect their growth rate and also reduce the efficiency with which the waste products are removed. It has been discovered that the optimum conditions for flow are an upward flow rate of about 1 foot per minute uniformly across the tank with the condition of flow being laminar, i.e. non-turbulent, a condition sometimes described as slug flow.

The water arriving at the upper end of the tank 6 spills over the upper end of the wall of the tank into an annular chamber 26 formed by a toroidal L-shaped channel member 28 secured to and extending around the tank 6 adjacent the upper end thereof. Extending upwardly around the upper end of the tank 6 above the water level is an annular screen 30, which in the preferred embodiment is formed from ⅛ inch wire mesh, through which the water leaving the interior of the drum passes to enter the annular chamber 26. The annular screen 30 filters out the solid wastes in the water which build up on the interior of the screen and additionally prevents any fish from passing into the annular channel 26. Periodically the wastes are scraped from the interior of the screen 30 by a workman using a scoop. Other waste products which are lost in some degree at the upper end of the tank are dissolved gaseous products, including ammonia and carbon dioxide, part of which pass into the atmosphere while some oxygen is absorbed therefrom.

It will be appreciated that it is necessary to treat the water leaving each fish tank before delivering it to the next downstream fish tank to reduce the level of harmful dissolved wastes and re-oxygenate the water. For these purposes each of the fish tanks 4, 6, 8 and 10 is provided with a water treatment unit 40 (FIG. 2) at the outlet from the tank. The treatment unit 40 (FIG. 3) is positioned beneath an outlet spout 42 in the channel member 28, through which water pours downwardly from the chamber 26. Positioned beneath the spout 42 is an upwardly facing outer cone 44 communicating at its lower end with the conduit 14 supplying the next downstream tank. Positioned concentrically within and spaced vertically from the outer cone is an inner cone 46. It will be understood that conventional supporting structure (not shown) connects the cones 44 and 46 with the adjacent tank. A short vertical pipe 48 passes centrally through and is supported by the inner cone 46, and has its upper end bent horizontally away from the tank.

The inner cone 46 is positioned beneath the spout 42 so that water pouring from the tank through the spout is directed into the inner cone. From there the water splashes over into the outer cone 44. The splashing action imparted by the inner cone turbulates the water quite violently causing dissolved waste product gases, notably ammonia and carbon dioxide, to come out of solution and pass into the atmosphere. In this way the water is treated to remove a substantial portion of the dissolved gaseous waste products.

The water that splashes out of the inner cone 46, as previously mentioned, passes into the outer cone 44. The conduit 14 to which the outer cone 44 is connected is of U-shaped configuration so that it has a standing column of water at all times in the conduit which extends up into the upper cone 44 where the level of the surface of the water is spaced below the water in the inner cone. As the water passes down through the conduit 14 it passes at a rapid rate of flow past the open lower end of the pipe 48 causing air to be sucked through the open upper end of the pipe 48 by a venturi-like effect, into the flowing water. Thus at its entry into the next downstream tank, the inflowing water contains both oxygen in solution and bubbles of air.

The water leaving the treatment unit 40 of the last fish tank 10 in the series, flows through a conduit 50 to the previously mentioned raceway 12. Fish may also be raised, though at a lower concentration, in the raceway 12 which is a shallow pond-like body of water having a large surface area. The large surface area of the raceway enables a substantial proportion of the dissolved gases in the water to escape into the atmosphere.

The described combination of four fish tanks provides a particularly satisfactory arrangement from the point of view of efficient use of water, although other numbers of tanks may be utilized. Of course the water will degrade somewhat in quality from the first fish tank to the last, particularly with respect to the amount of ammonia contained therein, and as a consequence the maximum density of fish that can be grown in each tank will decrease somewhat as the tank is further along in the flow of water. However as fish at different stages of growth require different densities of confinement, it is possible to arrange that fishes requiring a lesser concentration in confinement be placed in a tank further downstream than fish in a stage of growth which permits raising at a greater concentration.

To feed the fish, fish food is dropped in the upper end of the tank at appropriate intervals. The density of the fish food is sufficiently great to permit it to sink downwardly within the tank at a greater rate than the upflow of water carrying the waste products, so that the food is distributed to the fish.

The concentration of fish in the water that this invention contemplates making possible is a concentration of at least 6 pounds of fish per cubic foot of water. Maintaining fish life at this order of concentration requires a continuous rapid flow of highly oxygenated water in order to clear away growth inhibiting metabolites and provide growth stimulating oxygen, as previously mentioned. Thus the actual economic consideration is the number of pounds of fish that can be grown per unit flow of water per minute. It is contemplated that this invention will permit achieving growth rates of up to as much as 50 pounds of fish for each gallon per minute flow of water. In this connection the following exemplary table relating to the growth of trout is of interest.

TABLE

Growth of Trout

| | | | | |
|---|---|---|---|---|
| Concentration lb. fish/cu. ft. water | | | | 9.0 |
| Fish raised per unit flow of water lb/gal/min | | | | 13.5 |
| Conversion rate lb.food/lb. fish | | | | 1.5 |
| Length in inches | 2 | 4 | 6 | 8 | 10 |
| Feed rate at 50°F. % body weight/day | 3.4 | 2.0 | 1.4 | 1.1 | 0.9 |

Summarizing the above disclosure, the high density of fish in the tanks is from about 0.5 pounds per gallon of space up to about 2 pounds per gallon and under high oxygen conditions could be as high as 3 pounds per gallon. The usual range is about 1.25 pounds of fish per gallon of space in the tank. In addition the high density process of the present invention includes the water flow rate through the tank of from about 10 to about 20 pounds of fish per gallon of water per minute per tank.

While certain embodiments of the invention have been shown and described herein, it is to be understood that changes and additions may be made by those skilled in the art without departing from the scope and spirit of the invention.

I claim:

1. Apparatus for the intensive raising of fish for human consumption in a controlled environment comprising a tank adapted to contain water for the raising of said fish, water supply means for delivering water into said tank adjacent a porous plate positioned above a bottom thereof for distributing incoming water over the same and for conducting water through said tank from bottom to top in a substantially uniform upward direction across the width of said tank at a velocity of at least one foot per minute sufficient to move substantially all solid waste matter in an upward direction to the upper region of said tank, an external peripheral trough adjacent the upper edge of said tank for receiving and discharging the overlow from said tank including said solid waste matter and an aeration means connected with the tank below the porous plate for introducing oxygen into the water being supplied to said tank to maintain the oxygen level in said water at about the saturation level and aid in the upward flow and removal of waste.

2. In the apparatus of claim 1, screen means around the upper edge of said tank to retain fish within said tank while permitting overflow of water and said solid waste matter into said trough.

* * * * *